United States Patent [19]

Pyles

[11] 3,825,949

[45] July 23, 1974

[54] CARTRIDGE CHANGER WITH CARTRIDGE SENSING MEANS

[75] Inventor: Gerald Dee Pyles, Indianapolis, Ind.

[73] Assignee: RCA Corporation, New York, N.Y.

[22] Filed: Nov. 17, 1971

[21] Appl. No.: 199,483

[52] U.S. Cl. .................................. 360/91, 360/105
[51] Int. Cl. .......................................... G11b 23/10
[58] Field of Search ....... 274/4 F, 4 G; 179/100.2 Z

[56] References Cited

UNITED STATES PATENTS

| | | | |
|---|---|---|---|
| 3,083,269 | 3/1963 | Gaubert | 179/100.2 Z |
| 3,431,367 | 3/1969 | Nickl | 179/100.2 Z |
| 3,672,683 | 6/1972 | Ban | 274/4 F |

*Primary Examiner*—Stanley M. Urynowicz, Jr.
*Assistant Examiner*—David K. Moore
*Attorney, Agent, or Firm*—Eugene M. Whitacre

[57] ABSTRACT

A tape cartridge changer includes a plurality of tape cartridge receptacles which are each adapted to receive a tape cartridge and a movable structure which supports a portion of the changer playing mechanism. A movable mechanical stop is positioned adjacent each of the receptacles to block an inserted tape cartridge from being positioned in the path of travel of the movable structure. The movable structure as it moves toward each cartridge receptacle engages and moves the mechanical stop adjacent the cartridge receptacle away from its blocking position. This permits a tape cartridge in the cartridge receptacle to be brought into operative engagement with the portion of the tape changer playing mechanism supported by the movable structure.

Detector means at each of the cartridge receptacles sense the presence or absence of a tape cartridge in the receptacle. As the movable structure moves between the different cartridge receptacles, a switch mechanism mounted on the movable structure is actuated by the detector means when a cartridge is sensed as being present in the receptacle. The switch mechanism is operable when actuated to stop the movable structure at a predetermined point for playing a cartridge in the receptacle.

11 Claims, 6 Drawing Figures

INVENTOR.
Gerald D. Pyles
BY David E. Sitchenik
ATTORNEY

INVENTOR.
Gerald D. Pyles
BY David E. Pitchenik
ATTORNEY

INVENTOR.
Gerald D. Pyles.
BY David E. [illegible]
ATTORNEY

INVENTOR.
GERALD D. PYLES
BY David E. [signature]
ATTORNEY

INVENTOR.
Gerald D. Pyles
BY David E. Crutchfield
ATTORNEY

CARTRIDGE CHANGER WITH CARTRIDGE SENSING MEANS

The present invention relates to tape cartridge changers, and more particularly, to a mechanical gating system to insure that at any given time only one cartridge of a plurality of tape cartridges can be brought into engagement with the tape changer playing mechanism.

In tape cartridge changers, a plurality of tape cartridges are automatically, selectively or sequentially, brought into engagement with the changer playing mechanism. Often, the cartridges are supported in an array of cartridge receptacles. Cartridge changers of this type may be constructed such that each cartridge, when it is to be played, must be moved from a position in its cartridge receptacle where it is spaced apart from the changer playing mechanism to a second position where the cartridge engages the changer playing mechanism. Where the changer playing mechanism includes a structure which is moved between the different receptacle positions, it is possible for a tape cartridge to be inadvertently mispositioned in the path of travel of the moving structure when the cartridge is inserted into its receptacle. The movable structure may, for example, be a platform which is movable to be positioned adjacent a selected cartridge receptacle and which supports the changer transducer assembly and capstan. The tape cartridge can also become mispositioned in the path of travel of the movable structure when the cartridge changer is positioned with the cartridge receptacle array in a horizontal position; that is, where the tape cartridges are moved in a vertical direction to effect engagement or disengagement with the changer playing mechanism.

A tape cartridge changer embodying the present invention includes a movable structure which supports a portion of the changer playing mechanism. The changer includes a plurality of tape cartridge receptacles which are each adapted to receive a tape cartridge. A movable mechanical stop is positioned adjacent each of the receptacles to block an inserted tape cartridge from being positioned in the path of travel of the movable structure. The movable structure as it moves toward each cartridge receptacle engages and moves the mechanical stop adjacent the cartridge receptacle away from its blocking position. This permits a tape cartridge in the cartridge receptacle to be brought into operative engagement with the portion of the tape changer playing mechanism supported by the movable structure.

A complete understanding of the present invention may be obtained from the following detailed description of a specific embodiment thereof, when taken in conjunction with the accompanying drawings, in which.

Figure 1:
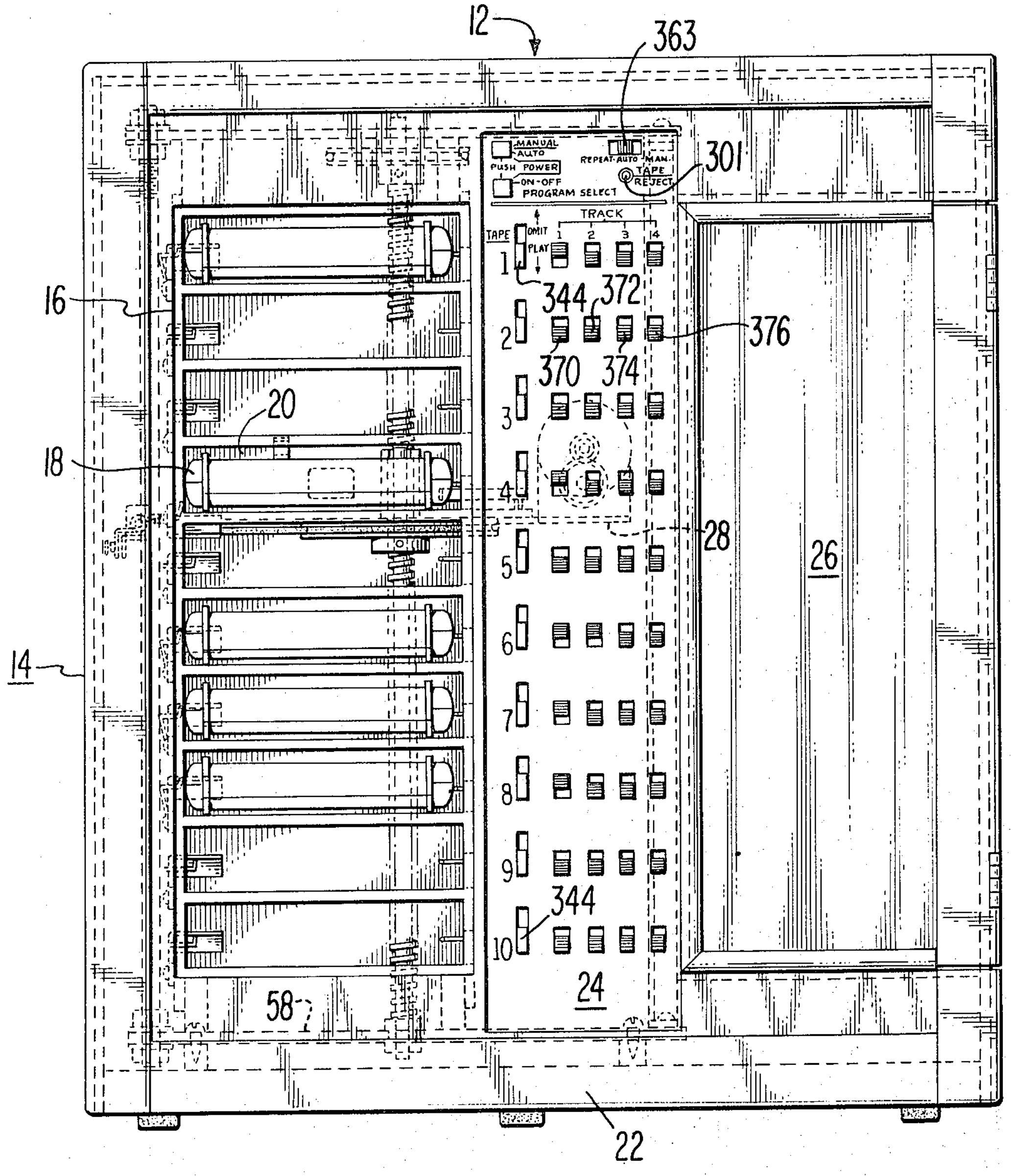
FIG. 1 is a front elevation view of a tap cartridge changer embodying the present invention.
Figure 5:
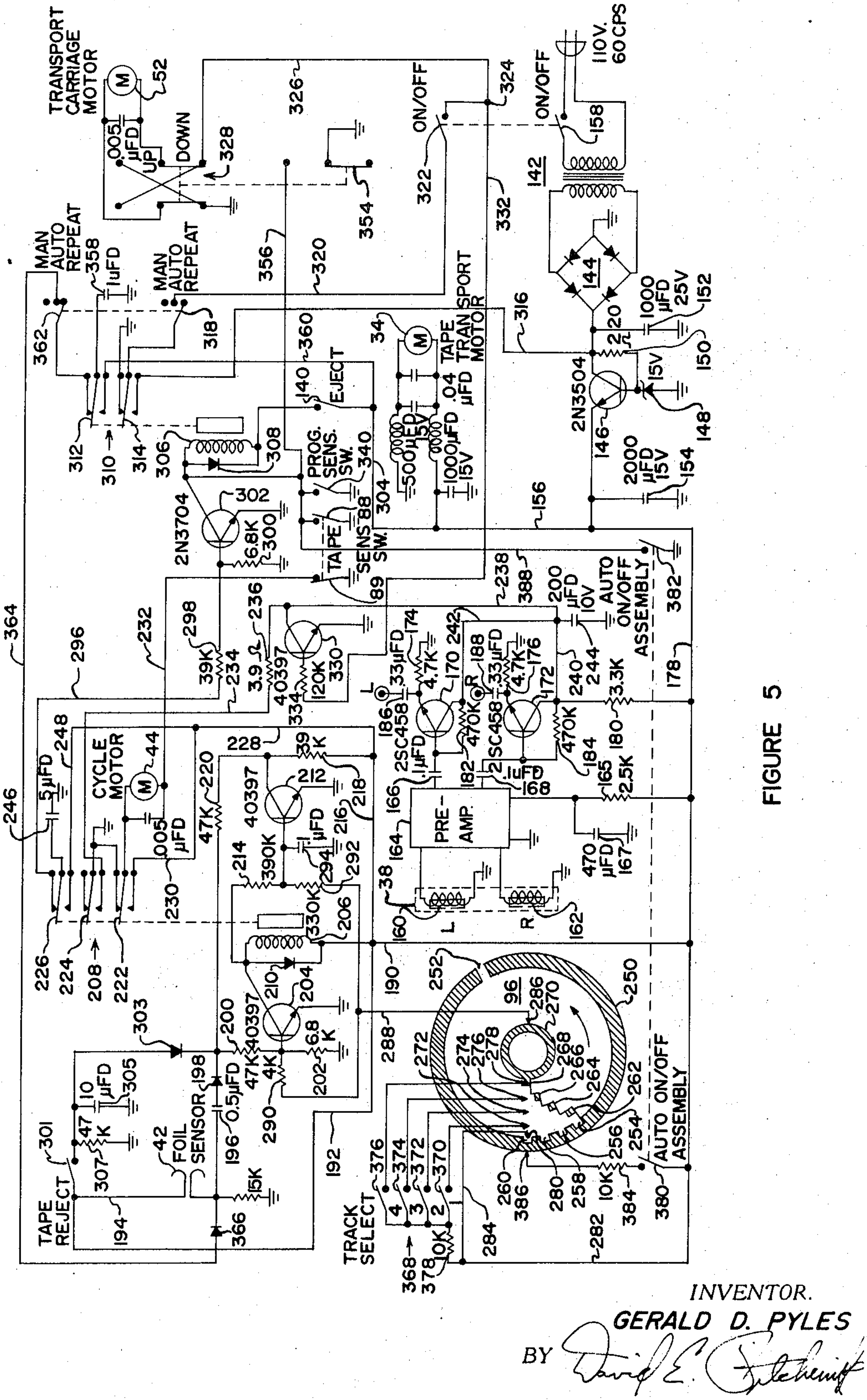
Figure 6:
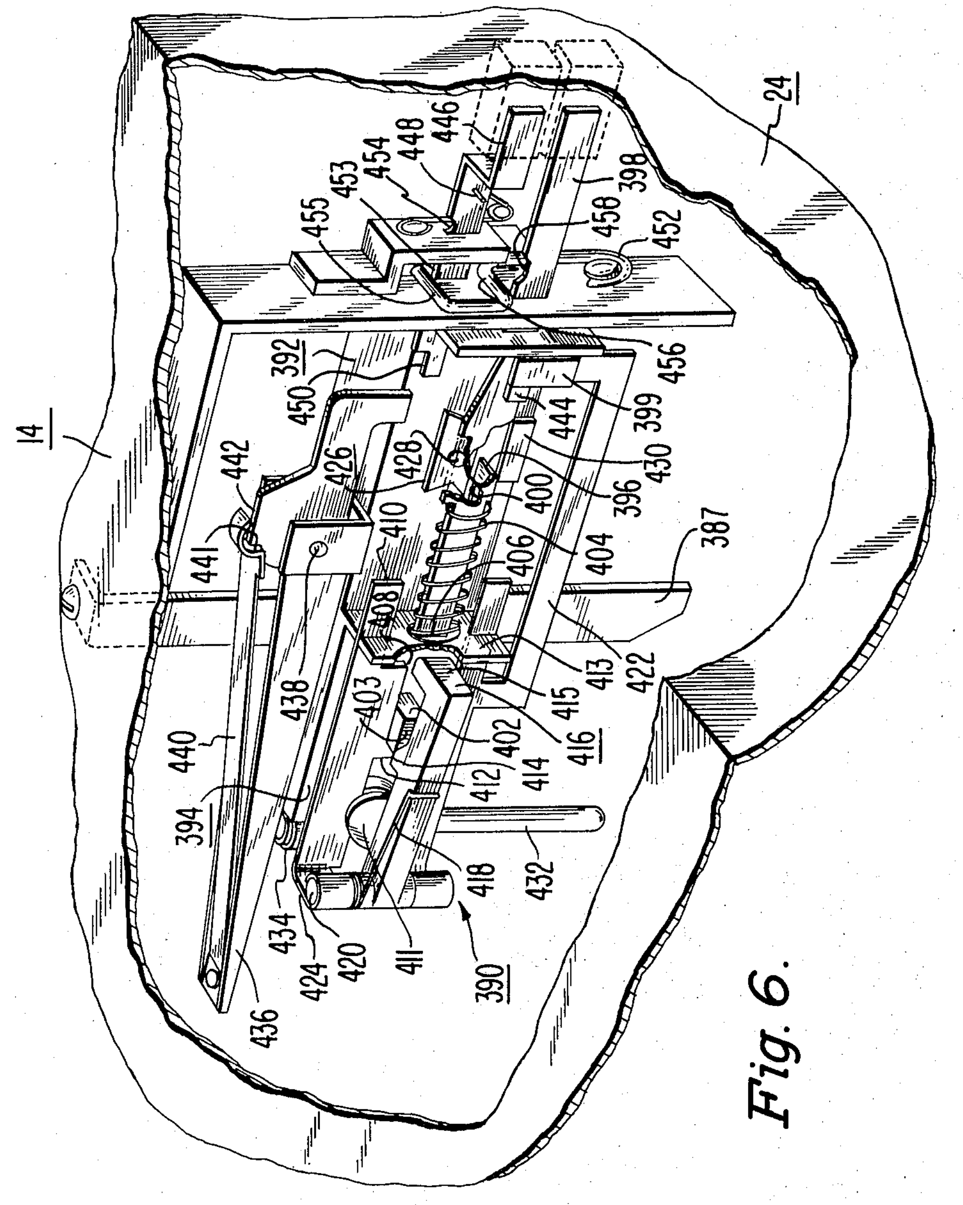

FIG. 5 is a schematic circuit diagram of the tape cartridge changer machine shown in FIG. 1 wherein the circuit switches are conditioned for playing the fourth program tracks of an eight track tape cartridge; and FIG. 6 is an enlarged left perspective view of the upper portion of the tape cartridge changer shown in FIG. 1, partially broken away to show the details of construction of the changer MANUAL/AUTOMATIC and POWER ON/OFF switch assembly.

I. GENERAL CONSTRUCTION

For the sake of clarity, where a plurality of identical structures are shown in the several figures, the reference numerals are applied to only one or a few of the identical structures. It should also be noted that the wiring interconnecting the various changer components schematically shown in FIG. 5, is not shown in FIGS. 1–4 and 6 to avoid abscuring the details of construction of the tape changer.

Referring now to FIGS. 1–4, a tape cartridge changer machine 12 includes a cabinet assembly 14 which houses the tape changer playing mechanism. An array 16 of cartridge receptacles is located at the front of the cabinet assembly. Tape cartridges are housed within several of the receptacles with the tape cartridge 18 housed within the receptacle 20 shown in playing engagement with the changer player mechanism. The front panel 22 of the cabinet assembly also includes a series of controls on a panel 24 and a storage bin 26 for unused tape cartridges. While the tap cartridges may be of the eight track endless loop variety, commonly called Stereo-8 tape cartridges, the machine is suitable for use with cartridges of any type.

Each of the receptacles within the array 16 is adapted to receive a tape cartridge which may be automatically, selectively or sequentially, brought into engagement with the cartridge tape changer playing mechanism. This is controlled by means of the controls on the control panel 24, which will be explained in greater detail hereinafter. It should be noted at this point, however, that the controls operate switches which are designated by the same reference numerals utilized in the schematic circuit diagram shown in FIG. 5.

The tape changer includes a vertically movable platform 28 which supports the cartridge tape transport and sound reproduction apparatus. Specifically, the platform 28 supports a capstan 30, the capstan flywheel 32, the capstan drive motor 34, the flywheel-motor drive belt 36, the transducer or pickup assembly 38, a transducer positioning mechanism 40, and a foil sensor 42. A motor 44 for driving both the transducer positioning mechanism 40 and a cartridge engagement-disengagement mechanism 46, by means of a cycling gear 48, is also mounted on the vertically movable platform 28.

The movable platform 28 is movable in a vertical direction by means of a worm screw 50 driven by a motor 52 mounted to a top plate 54 of the changer mechanism. The driven worm screw 50 cooperates with a worm screw nut 56 which is secured to the movable platform 28. The motor 52 drives the worm screw which propels the movable platform along its path of motion between the mechanism top plate 54 and bottom plate 58. The inherent self-locking properties of the worm screw 50 and worm screw nut 56 securely retain the movable platform 28 and the player components supported thereon, in the various positions required for engagement and disengagement of each tape cartridge housed in array 16. The control of the motor 52 will be described in greater detail hereinafter in conjunction with the description of the schematic circuit diagram shown in FIG. 5.

II. CARTRIDGE RECEPTACLES

In the operation of the tape cartridge changer 12, it is desirable to provide a positive detent for each of the tape cartridges housed within the cartridge receptacles and to restrain the cartridges from being accidentally moved into the path of the movable platform 28 except for a given cartridge when the platform is correctly positioned to engage and move the cartridge. This insures that the mechanism will not be inadvertently damaged by the accidental positioning of a tape cartridge in the path of movement of the movable platform 28.

Figure 4:
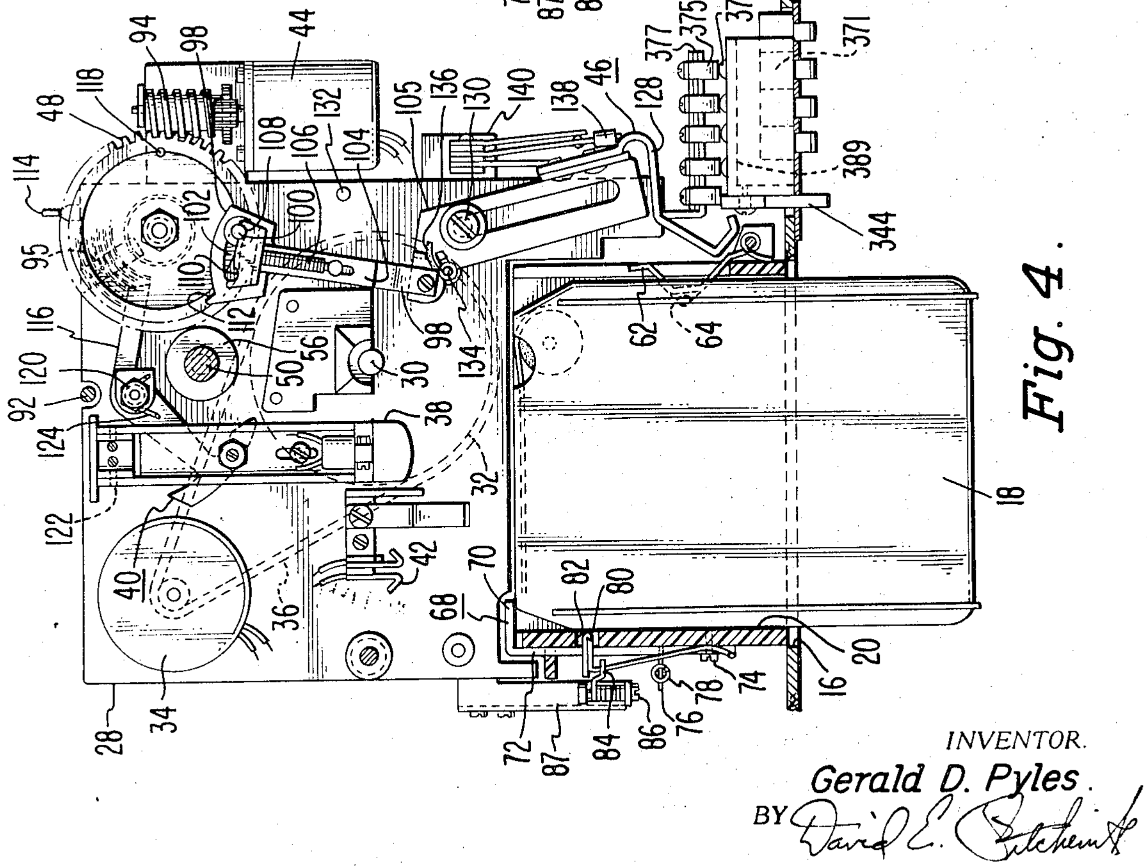
FIG. 4 is a partial section view of the tape cartridge changer machine shown in FIG. 1 with a tape cartridge disengaged from the tape changer playing mechanism.

As is most clearly shown in FIG. 4, the cartridge receptacles in the array 16 are dimensioned so that an inserted tape cartridges extends beyond the front panel 22 of the changer cabinet assembly. This permits easy handling of the cartridge for insertion and withdrawal from the tape cartrige receptacle. Each receptacle is a rectangular enclosure opened at opposing ends and essentially forms a communicating tunnel between the interior and exterior of the tape cartridge changer 12. The cartridge receptacles each include a slotted side 60. A detent spring 62 extends through the slotted side 60 into the interior of the cartridge receptacle to engage the detent notch 64 of a tape cartridge positioned within the receptacle but not engaged with the tape changer player mechanism. The detent spring 62 cooperates with the tape cartridge notch to accurately position the cartridge within the receptacle so that the cartridge will be in proper position to be manipulated by the changer engage-disengage mechanism 46.

The depth of penetration of the detent spring 62 into the cartridge receptacle can be controlled to determine the strength of the detent so that it will be sufficiently strong to positively detent the cartridge, yet still permit the cartridge to be withdrawn from the detent position into engagement with the tape changer player mechanism or withdrawn from the cartridge receptacle.

An L-shaped bracket 68 is secured to the side of each cartridge receptacle. A portion of the bracket 70 extends across part of the forward opening of the cartridge receptacle. This prevents the tape cartridge from being moved forward into the path of the movable platform 28, unless the bracket portion 70 is moved away from its interference position with the tape cartridge front end. Moreover, it permits the changer to be played in a horizontal position without the danger of a tape cartridge slipping into the path of the movable platform 28. The second portion 72 of the L-shaped bracket 68 extends along the outside surface of the receptacle. The portion 72 is rotatably secured to the side of the receptacle by means of a pin 74. A fitting 76 is secured to the bracket portion 72 and is biased by a spring 78 to resiliently urge the L-shaped bracket 68 towards its interference position. When the L-shaped bracket 68 is rotated around the pin 74, the front portion 70 of the bracket is displaced out of its interference position. This allows movement of a tape cartridge housed within the receptacle through the receptacle forward opening into engagement with the tape changer mechanism. After the cartridge has been played by the changer and is re-inserted into the receptacle, the spring 78 returns the L-shaped bracket 68 to its interference position.

A spring wire feeler 80 is secured at one end to the L-shaped bracket 68 near the pin 74 at each of the cartridge receptacles. The feeler 80 is shaped to protrude through a small opening 82 into the interior of the cartridge receptacle. This permits the spring wire feeler 80 to sense the presence or absence of a tape cartridge in the receptacle. If a tape cartridge is present, the feeler will be deflected outward and extend across and beyond the L-shaped bracket portion 72. In its extended position, the feeler 80 is in an interference position with a feeler 84 which is mounted to the movable platform 28. As the movable platform 28 descends toward the base plate 58 of the changer 12, the feeler 84 will bear against the extended feeler 80 and cause it to bear against the L-shaped bracket 68, thereby rotating the bracket 68 to move the front portion 70 of the bracket 68 out of its interference position with the front of the tape cartridge.

The interference between the feelers 80 and 84 also causes the feeler 84 to rotate slightly on its mounting pin 86 so that the other end of the feeler 84 simultaneously opens a switch 88 and closes a switch 89, both of which are ganged together and mounted in a housing 87. The opening of the switch 88 de-energizes the motor 52 and the worm screw 50 stops rotating if the program switch 340 (FIG. 5) is also open (program switch lever 344 shown in FIG. 1 in play position), indicating the cartridge detected in the receptacle is programmed to be played. This positions the movable platform 28 in proper position for a tape cartridge to be withdrawn from the receptacle and into engagement with the tape cartridge changer playing mechanism. The closing of the switch 89 enables the cycle motor to be energized.

When no cartridge is present in a given tape cartridge receptacle, the spring feeler 80 will protrude into the tape cartridge receptacle. At this time, the feeler 80 will lie flush against the side of the receptacle and will not be in the path of travel of the feeler 84 as the movable platform 28 descends. Thus, the feeler 84 will not rotate on its mounting pin 86 as it passes the non-used receptacle position and the switch 88 will not be opened. The motor 52 will continue to run and drive the worm screw to move platform 28 downward until the feeler 84 interferes with a given feeler 80 to cause the motor 52 to be de-energized.

When the movable platform 28 approaches the bottom plate (beneath the lowermost cartridge receptacle), it strikes a bearing surface 90 which is secured to a rod 92 and a platform spring bumper 91. This deflects the rod 92 downward and causes it to actuate a motor reverse switch assembly 93 which will reverse the direction of rotation of the motor 52. The reversal of the direction of rotation of the motor 52 reverses the direction of rotation of the worm screw 50 and drives the screw to move the platform 28 up toward the top plate 54. As the movable platform 28 is moved upward, feeler 84 bears against the underside of any feeler 80 in its path of travel and rotates around its mounting pin 86 to move out of its interference position with the feeler 80. Switch 88 is not actuated by the rotation of the feeler 84 because it is in the opposite direction for actuation of the switch 88.

III. CYCLING GEAR AND LEVER SYSTEM

The motor 44 is coupled by means of a worm gear 94 to the cycling gear 48. Control of the motor 44, as to its starting and stopping sequences, is determined by the angular position of the cycling gear 48 which functions to drive the transducer positioning mechanism 40 and the cartridge engagment-disengagement mechanism 46. The angular position of the gear 48 is sensed by means of a series of contact feelers 95 which engage a printed circuit pattern 96 on a printed circuit board secured to the lower major surface of the cycling gear 48. The printed circuit pattern and feeler contacts will be explained in greater detail in conjunction with the description of the schematic circuit diagram shown in FIG. 5.

A lever 98 is coupled to the cycling gear 48 by means of a pin 100 which is captivated in an arcuate slot 102 within the lever. A slide member 104 is mounted for reciprocating motion along the length of the lever 98 and is biased by means of a spring 106 to bear against the pin 100. The portion of the sliding member 104 which engages the pin 100 is an arcuate surface with a detent notch 108 and 110, respectively at each extremity. These notches detent the pin 100 captivated within the lever slot when the pin is positioned at either of the extremities of the arcuate slot 102.

Figure 3:
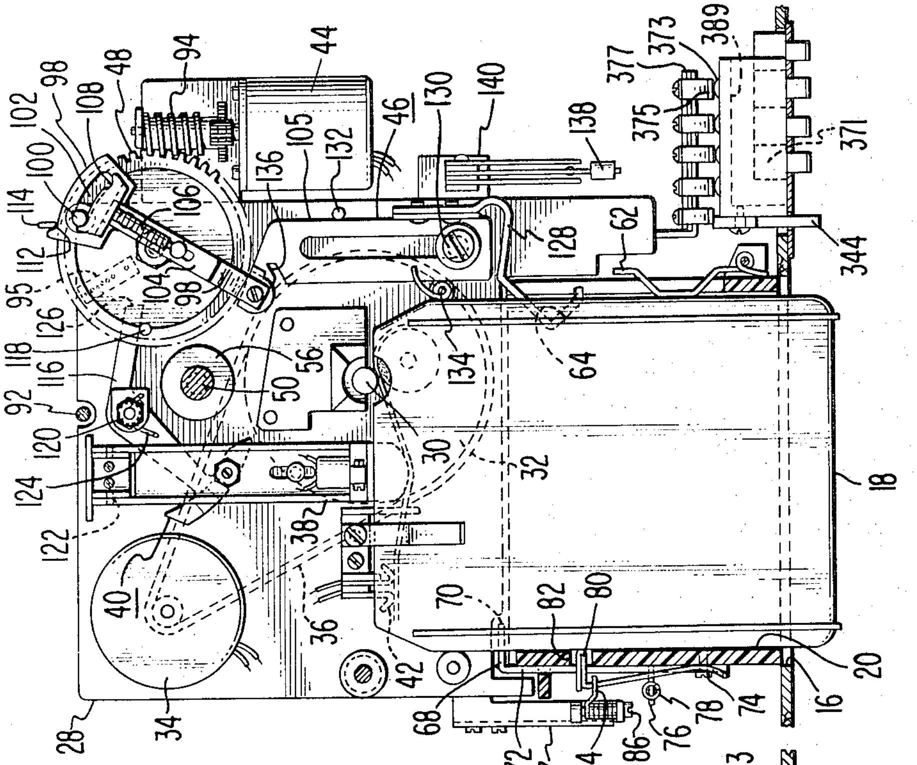
FIG. 3 is a partial section view of the tape cartridge changer shown in FIG. 1 with a tape cartridge engaged with the tape changer playing mechanism.

When the cycling gear 48 is driven by the motor 44 it rotates in a clockwise direction as viewed in FIGS. 3 and 4. In FIG. 3 the tape cartridge changer is shown with a tape cartridge fully engaged and being played. The cycling gear 48 is positioned for the playing of Program One tracks of the eight track tape cartridge. A detent notch 112 on the lever 98 cooperates with the stud 114 secured to the movable platform 28 to hold the lever 98 in position even when the pin 100 is moved out of the detent notch 110 toward the opposite extremity of the arcuate slot 102. Movement of the pin within the slot is associated with moving the transducer positioning mechanism 40 to move the transducer or pickup assembly between the several tracks of the tape cartridge. Movement of the pin beyond the extremity of the arcuate slot 102 causes a force to be exerted on the lever 98 to pull the lever out of its detent position. Thus, as the pin 100 engages the detent 108 end of the slot 102, it pulls the lever 98 so that the stud 114 is deflected out from the detent 112 and permits the gear to transfer a force through pin 100 and the ever 98 to the reciprocating slide lever 105.

A. CARTRIDGE ENGAGEMENT-DISENGAGEMENT MECHANISM

An angled resilient lever extension 128, having a portion shaped to conform to the notch in the tape cartridge, is affixed to the reciprocating slide lever 105. The lever extension 128 is adapted to manipulate the tape cartridge by engaging the cartridge detent notch. The lever extension 128 moves the cartridge into and out of engagement with the changer playing mechanism. As shown in FIG. 3, the lever extension 128, because of the dimensions of the several levers and the resilient nature of the lever extension itself, exerts a force against the cartridge notch forward wall to maintain pressure between the cartridge pressure roller and the tape changer capstan.

Figure 2:
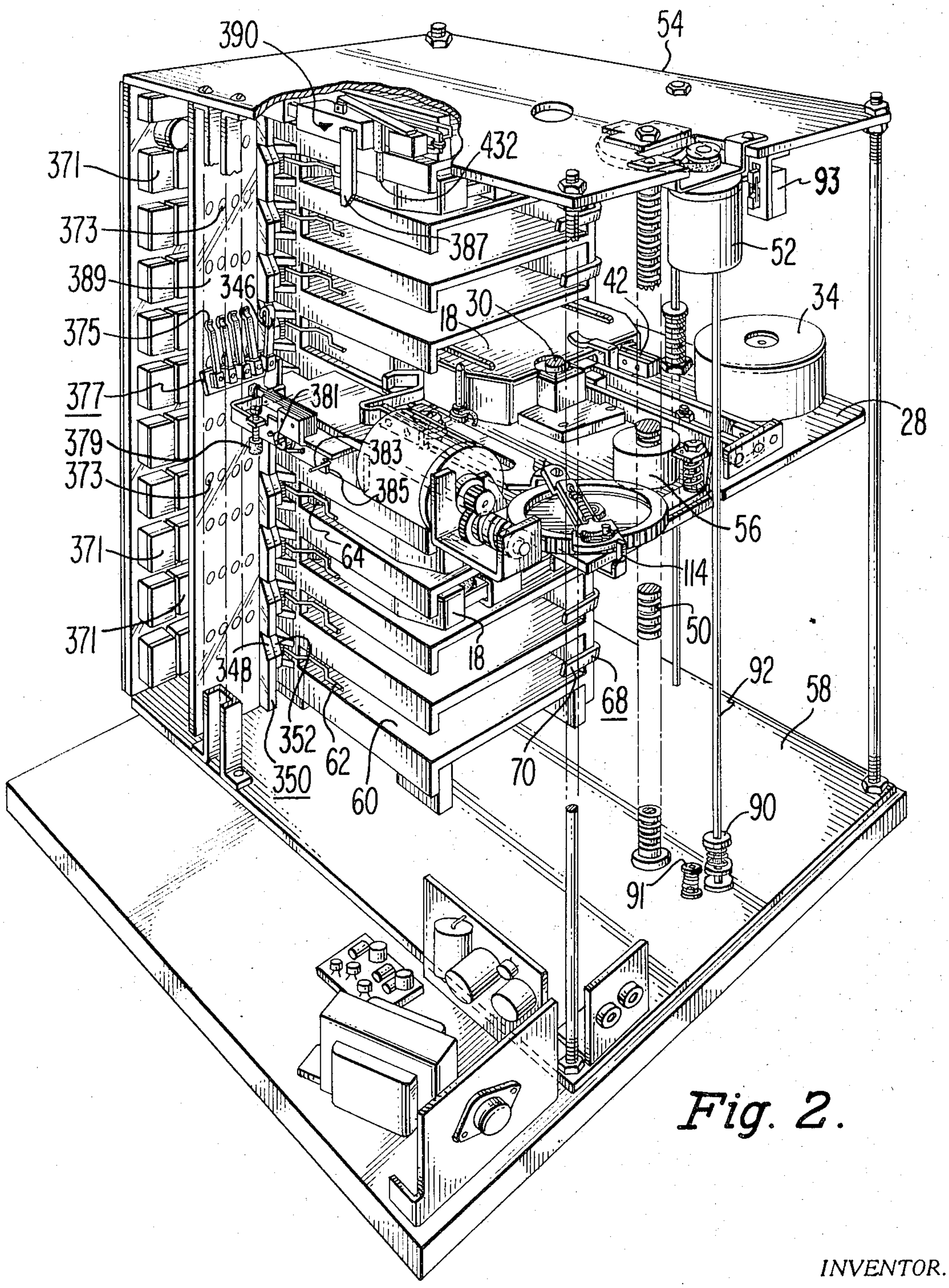
FIG. 2 is a rear perspective view, partially broken away, of the tape cartridge changer shown in FIG. 1 with the cabinet assembly removed to expose the player mechanism.

When a tape cartridge is to be ejected, cycling gear 48 rotates in a clockwise direction and pin 100 moves along arcuate slot 102, falling into the detent 108 and thereafter pulling lever 98 out of its detent position. this reverses the direction of force exerted by the lever extension 128 on the cartridge notch walls such that it urges the cartridge out of engagement with the tape changer player mechanism. The force is transmitted from the pin 100 through the lever 98 and the reciprocating slide lever 105 to the lever extension 128. As the gear rotates, the reciprocating slide lever is guided by a pin 130 captivated within a slot in the slide 105 and two guide pins 132 and 134 which bear against the outer surfaces of the lever. The reciprocating slide lever 105 passes through the slot 60 in the cartridge receptacle as it moves the tape cartridge. After the cartridge is moved back to its detent position within the receptacle, the lever extension rotates away from the cartridge notch to permit vertical movement of the movable platform 28 to another cartridge receptacle position. As can be seen in FIG. 2, the width of the resilient lever extension is less than the width of the cartridge notch, leaving space at the top of the notch for the detent spring 62. The rotary motion of the lever extension 128 is caused by the guide pin 134 moving into an arcuate slot 136 in the reciprocating slide lever 105. This allows the reciprocating slide lever 105 to pivot around the pin 130 to change the reciprocating motion to a rotary motion.

When the lever extension 128 rotates away from the cartridge notch (FIG. 4), it engages a lever 138 which closes the contacts of a switch 140. The switch 140 is mounted on the movable platform 28 and is associated with the control circuits for the motor 52. The switch 140 functions as an interlock for the control circuits for the motor 52 to enable the motor 52 to run only when the lever extension 128 is completely disengaged from the cartridge notch. Thus, the motor 52 cannot run whenever the engagement-disengagement mechanism 46 is manipulating a cartridge and, hence, the worm screw 50 cannot accidentally be rotated to move the platform 28 which would cause damage to the changer mechanism.

When the movable platform 28 descends to the next occupied cartridge position, it will stop with the player components on the movable platform 28 positioned as shown in FIG. 4, and the cycling gear 48 will again begin to rotate in a clockwise direction. This will cause the pin 100 to move out of the detent 108 and travel along the arcuate slot 102 bearing against the top surface of the slot until it reaches the detent 110. As the pin 100 falls into the detent 110, it bears against the extremity of the slot 102 and draws the lever 98 toward the rear of the changer. This causes the reciprocating slide lever 105 to rotate around the pin 130 so that the lever extension 128 moves into the cartridge notch. The cycling gear 48 continues to rotate and the lever extension bears against the cartridge notch walls, thereby terminating the rotary movement of the reciprocating slide lever. The reciprocating slide lever, under the force exerted by slide 98, begins to pull the tape cartridge by the cartridge notch front wall, into engagement with the changer player mechanism. The reciprocating slide lever, during this portion of its movement, is guided by the pin 130 and the guide pins 132 and 134, which bear against the outer sides of the lever. The cycling gear 48 rotates until the detent 112 on the lever 98 engages the stud 114. At this time, the changer components assume the position shown in FIG. 3 of the drawings and the Program One tracks of the tape cartridge begin to be played. With the lever extension 128 engaged with the cartridge notch, the lever extension is disengaged from the lever 138 and the switch 140 is opened. This causes the control circuits for the motor 52 to disable the motor 52 from running which would rotate the worm screw 50 and thereby move the platform 28.

B. TRANSDUCER POSITIONING MECHANISM

The transducer positioning mechanism 40 includes a program or track change lever 116 which is positioned to interfere with a pin 118 which extends through the cycling gear 48 to the underside of the cycling gear. The force of the pin 118 against the track change lever 116 causes the lever 116 to pivot around a bushing assembly 120. One end of the track change lever 116 has a cam surface with graduate steps. The sloped connecting surfaces between the steps raise and lower (depending upon the direction of movement of the track change lever 116) the transducer assembly 38 which pivots around a pin 122. The position of the cycling gear 48 and, thus, the pin 118, determines the position of the track change lever 116.

The track change lever is shown in FIGS. 3 and 4 positioned to support the transducer assembly 38 to play the Program One tracks of the tape cartridge. Approximately 12° of clockwise rotation of the cycling gear 48 after the pin 118 engages the track changer lever 116 will move the lever 116 and hence, the transducer assembly 38, to a new position corresponding to the Program Two tracks of the tape cartridge. In this manner, each 12° of rotation of the cycling gear 48 moves the track change lever 116 and transducer assembly 38 between successive program tracks until the pin 100 reaches the extremity of the arcuate slot 102 in lever 98. This corresponds to the Program Four tracks of the cartridge.

The track change lever 116 is spring biased by means of a coil spring 124 mounted on the bushing assembly 120. The spring 124 urges the channel change lever to rotate to the position corresponding to the Program One tracks for the tape cartridge (FIG. 4) when the pin 118, due to the continued rotation of the cycling gear 48, slips off the end 126 of lever 116 and moves out of contact with the lever due to the clockwise rotation of the cycling gear 48.

IV. CIRCUIT OPERATION

Reference is now made to FIG. 5, which shows the schematic circuit diagram of the tape cartridge changer with the changer conditioned for the playing of the Program Four set of tracks of an eight track tape cartridge. A source of 110 volts, 60 cycle operating potential is applied to a transformer 142 whose output is connected to a full wave bridge rectifier 144. The rectified output voltage is applied to the collector electrode of a transistor voltage regulator 146. The base electrode of the transistor 146 is connected to ground by a 15 volt Zener diode 148, whose cathode is coupled to the transistor's collector electrode by a resistor 150. Two capacitors 152 and 154 are coupled between the collector and emitter electrodes of the transistor 146, respectively and ground to inhibit voltage variations at the electrodes of the transistor.

The regulated voltage at the emitter electrode of the transistor 146 is applied via the lead 156 to the tape transport motor 34 which runs continously whenever the changer ON/OFF switch 158 is closed. The motor 34 propels the magnetic tape of the particular tape cartridge being played.

The transducer assembly 38 includes two transducing elements 160 and 162 for detecting information recorded on the cartridge magnetic tape for the left and right sound channels as the tape is propelled across the transducing elements. The output signals from the transducers are coupled to a preamplifier 164 which amplifies the signals and applies them via the coupling capacitors 166 and 168 to the base electrodes of a left channel driver transistor 170 and a right channel driver transistor 172. The preamplifier 164 is energized from the regulated voltage supply 146 through the lead 178 and a resistor 165. A filter capacitor 167 is coupled to the resistor 165. The transistors 170 and 172 are connected as emitter-follower amplifiers with signals derived at their emitter electrodes across the resistors 174 and 176. Operating potential is applied to the transistors 170 and 172 from the regulated voltage supply 146 via the lead 178 and resistor 189. A resistor, 182 and 184, respectively, is coupled between the collector and base electrodes of each transistor to apply the necessary bias voltage to the transistor's base electrodes. The output signals from the transistors 170 and 172 are applied via the coupling capacitors 186 and 188 to left and right sound channel terminals associated with a driver amplifier, not shown.

After the tape cartridge Program Four tracks have been played, a metal foil on the magnetic tape passes across the foil sensor terminals 42 and current flows from the emitter electrode of the voltage regulator transistor 146 through the leads 178, 190, 192, 194, the foil sensor 42, and the series connection of the capacitor 196, the diode 198, a resistor 200 and a resistor 202 to ground. Since the capacitor 196 is normally discharged, the detection of the foil by the foil sensor 42, initially results in a current flow through the capacitor 196, diode 198, resistor 200 and resistor 202 to develop a voltage across the resistor 202 which momentarily biases transistor 204 into conduction. The momentary conduction of the transistor 204 causes current to flow through a relay winding 206 to toggle the relay switch assembly 208. A diode 210 is coupled across the relay winding 206 to prevent spike voltages from developing which may damage transistor 204.

When transistor 204 is biased into conduction, its collector electrode voltage drops toward ground potential, and the voltage normally applied to the base electrode of a transistor 212 from the regulated voltage supply 146 via the leads 178 and 190, the winding 206, and a resistor 214 is removed. This causes the transistor 212 to be biased out of conduction. As a consequence, a voltage is applied to the base electrode of the transistor 204 from the regulated voltage supply 146 through leads 178 and 190, lead 216, a resistor 218, a resistor 220, and the resistor 200. This insures that transistor 204 remains biased for conduction after the capacitor 196 charges. Thus, current continues to flow through the relay winding 206 via the collector-emitter electrode current path of the transistor 204 which holds the relay switch assembly 208 contacts in their toggled positions.

The relay switch assembly 208 includes three switch sections 22, 224 and 226. These switches are shown in the condition they normally have when the relay winding 206 is not energized. Assuming, however, that the relay winding is energized as just described, the switch contacts 222 are positioned such that a positive potential is applied from regulated voltage supply 146 via the leads 178 and 190, the lead 216, the lead 228, the lead 230, and the switch contacts 222 to energize the cycle motor 44. The cycle motor will thus be energized to run if a tape cartridge is detected as present in the cartridge receptacle so that the switch 89 in the ground return lead 232 for the cycle motor 44 is closed. The switch 89 is closed only when a cartridge is detected as being present by feeler 84 interfering with feeler 80 (FIGS. 3 and 4). The cycle motor 44 drives the cycling gear 48 which begins to rotate.

With the relay winding 206 energized, the switch contacts 224 connect the collector electrode of the emitterfollower amplifiers 170 and 172 to ground by the circuit path including the switch contacts 224, the lead 234, a resistor 236, the lead 238, and the leads 240 and 242, respectively. This provides an audio muting during the cycling operation of the tape cartridge changer. The normally charged capacitor 244 simultaneously discharges through the above-described circuit path. The capacitor functions to provide a time delay when the switch contacts 224 open before the transistors 172 and 174 are rendered conductive to prevent noise associated with the switch opening from passing through the sound channels.

Energization of the relay winding 206 causes the relay switch contacts 226 to be in a position such that a capacitor 246 is charged from the regulated voltage supply 146 via the leads 178, 190, 216, 228, a lead 248, and the relay switch contacts 226. The charged capacitor functions to provide a momentary voltage once the relay contacts toggle when the relay winding 206 is deenergized returning the switch contacts to the position shown in the drawing.

Since the relay switch contacts 222, when the relay winding 206 is energized, are positioned to cause the cycle motor 44 to run the cycle gear 48 which supports the printed circuit pattern 96 on its lower major surface (a bottom view of which is shown in FIG. 5) rotates. The printed circuit pattern includes an outer conductive ring 250 broken at one point 252 and a series of notched inner portions 254, 256, 258 and 260. The printed circuit pattern also includes a series of electrically interconnected conductive pads 262, 264, 266, and 268. These pads are positioned to provide a conductive path between the outer conductive ring 250 and an inner conductive ring 270. The pads are positioned to occupy an area which overlies a radial line from the center of the gear through each notched portion and to engage one of a series of feeler contacts 272, 274, 276, and 278 whenever the feeler contact 280 is positioned in one of the notched portions.

As the gear begins to rotate, the feeler contact 280 engages the inside periphery of the outer ring 250 and applies a potential to the ring from the regulated voltage supply 146 via the leads 178, 282, and 284. This voltage is coupled through the stair case conductive pads 262, 264, 266 and 268 to the inner conductive ring 270 where a feeler contact 286 applies the voltage via the lead 288 and a resistor 290 to the base electrode of the transistor 204 causing the transistor to be biased for conduction. Simultaneously, the voltage is applied through the lead 288 and a resistor 292 to the base electrode of the transistor 212. This charges a capacitor 294 and after a short delay biases transistor 212 into conduction which causes the voltage at its collector electrode to drop toward ground potential. Consequently, the voltage applied to the transistor 204 from the regulated voltage supply 146 via the leads 178, 190, 212 and resistors 218, 220 and 200 is removed. Nevertheless, since the transistor is biased by the voltage applied to the feeler contact 286, transistor 204 remains biased into conduction, and hence, the relay winding 206 remains energized. Cycling gear 48 continues to rotate until the feeler contact 280 falls into the non-conductive slot 252. At this time, the voltage is no longer applied to the outer conductive ring 250. It should be noted that whenever a voltage is applied to any portion of the printed circuit pattern 96 and a cartridge is detected as present in the cartridge receptacle (switch 89 closed), the cycle motor 44 will be energized to run.

When the voltage is removed from the outer conductive ring 250, the transistor 204 is immediately biased out of conduction while the transistor 212, due to the charge on the capacitor 294, remains biased for conduction. With the transistor 204 non-conductive, current ceases to flow through the relay winding 206, except for a small residual current associated with the bias of transistor 212, and the voltage at the collector electrode of the transistor 204 rises. Consequently, the relay switch contacts change position or toggle. Transistor 212, however, remains biased for conduction by the voltage from the regulated voltage supply 146 through leads 178 and 190, the relay winding 206 and the resistor 214. The cycling gear 48, with the feeler 280 positioned in the slot 252, is in the eject position shown in FIG. 4.

The motor 44 can also be made to drive the cycling gear 48 to rotate to the eject position whenever a tape reject switch 201 is closed. Closing of the switch 301 completes a circuit path from the regulated voltage supply 146 through the lead 178, the lead 190, the lead 192, the tape reject switch 301, a diode 303, and the resistors 200 to bias the transistor 204 into conduction and thus energize the relay winding 206. With the relay winding 206 energized, the relay switch assembly 208 toggles and the motor 44 is energized to drive the cycling gear 48.

The initial closing of the switch 301 charges a capacitor 305 connected across the resistor 307. The time constant of the capaictor 305, as determined by the circuit resistance, is such that even if the switch 301 opens, the transistor 204 will remain biased for conduction for a sufficient time to permit the cycling gear 48 to rotate through an acute angle in excess of that formed between radial lines extending from the center of the inner conductive ring 270, and through the notched inner portions 254 and 260. Consequently, if the feeler contact 280 is resting in the notch 254, gear 48 will rotate enough to cause the feeler contact to rest on the inner periphery of the conductive ring 250 beyond the notch 260. As previously described, the cycle gear 48 will rotate until the feeler contact 280 drops into the non-conductive slot 252, at which time the changer 12 is in the eject position as shown in FIG. 4.

When the relay winding 206 becomes de-energized, the relay switch assembly 208 contacts assume the position shown in the drawing and the capacitor 246 discharges through the lead 296 and the resistors 298 and 300. This applies a positive potential to the base electrode of a transistor 302 to momentarily bias it into conduction. The transistor 302 will conduct if the eject switch 140 is closed. This closes whenever the lever extension 128 assumes the position shown in FIG. 4, indicating that lever 128 is disengaged from the cartridge notch. This prevents the movable platform 28 from being moved in a vertical direction by the transport motor 52 unless the lever extension 128 is disengaged from the cartridge notch. If the eject switch 140 is closed, a current flows from the regulated voltage supply 146 through the lead 156, a lead 304, the switch 140, a relay winding 306, and the collectoremitter electrodes of the transistors 302. A diode 308 is coupled across the relay winding 306 to prevent spike voltages from developing which could cause damage to the transistor 302.

The energization of the relay winding 306 causes a relay switch assembly 310 to toggle. The relay switch assembly 310 includes two switch contact sections 312 and 314. When the relay winding 306 is energized, the potential at the collector electrode of the voltage regulator transistor 146 is applied via a lead 316, the relay switch 314 and a MANUAL/AUTOMATIC/REPEAT switch 318, when closed, the lead 320, and ON/OFF switch 322, when closed, a junction 324, a lead 326, and the motor reversing switch 328 to the transport motor 52. This energizes the transport motor and causes it to run to move the movable platform 28. The movable platform will be moved down toward the bottom plate 58 with the reversing switch 328 in the position shown. The voltage at the junction 324 is applied to the base electrode of a transistor 330 via the lead 332 and the resistor 334. This biases transistor 330 into conduction which is connected by lead 238 to the collector electrodes of the emitter-follower transistors 170 172. As a result, the emitter-follower transistors are biased off to provide audio muting whenever the transport carriage motor 52 is energized to run.

Where the eject switch 140 is closed (lever extension 128 disengaged), and with either switch 88 closed (which occurs after the movable platform begins to descend) or switch 340 closed, the relay 306 will remain energized and the tape transport motor will continue to run. The switch 88 is closed after the energization of relay winding 306 due to the momentary conduction of transistor 302 which allows the movable platform 28 to move away from an occupied cartridge receptacle position such that the feelers 80 and 84 do not interfere. The feelers 80 and 84 do not interfere while the movable platform moves between occupied cartridge receptacle positions or past an occupied cartridge receptacle position. The program switch 340 is operated by the program switch lever 344 on the changer control panel 24 at each receptacle position to permit the receptacle to be bypassed by the movable platform 28 even though a cartridge is detected as present (switch 88 open). Thus, with a program switch lever in the omit position, the switch operator 346 (FIG. 2) is blocked from falling into the notch 348 on cam surface 350 at a given position which causes the switch 340 to be closed. The notch is blocked by moving a parallel blocking member 352 adjacent to the notch (program switch lever in up position). The switch 340 is a leaf switch with operator 346 being one of the contacts and the other contact being hidden from view.

When the movable platform 28 approaches the changer bottom plate 58, it will hit the bearing surface 90 (FIG. 1), and toggle the reversing switch 328 causing a reversal of the transport carriage motor rotation to thereby drive the movable platform up toward the changer top plate 54. A switch 354, which is ganged to the reversing motor switch 328, closes to provide a holding circuit for the relay winding 306 through the lead 356 and the eject switch 140. This insures that the relay winding 306 remains energized and the transport carriage motor 52 will run until the movable platform 28 approaches the changer top plate 54 and is above the uppermost cartridge receptacle.

As the movable platform 28 approaches the changer top plate, it will strike the upper bearing surface (not shown) on the rod 92 and again toggle the motor reversing switch 328 to reverse the potential applied to the motor 52. This changes the direction of rotation of the motor shaft and the movable platform 28 begins to descend. Toggling of the switch 328 to cause the movable platform to descend opens the ganged switch 354 to assume the positions shown.

When the relay switch contacts 312 toggle due to the energization to relay winding 306, a capacitor 358 is charged from the regulated voltage supply 146 via the leads 156, 360 and the switch contacts 312. When the relay winding 306 is de-energized and the relay switch contacts 312 toggle to the position shown, the capacitor 358 discharges through the MANUAL/AUTOMATIC/REPEAT switch 362, when closed, a lead 364, a diode 366, the series connection of the capacitor 196, the diode 198, the resistor 200 to the base electrode of the transistor 204 to bias the transistor 204 into conduction.

It will be recognized that the above discussion concerning movable paltform drive motor control circuitry requires that the cycle gear 48 be in the eject position (FIG. 4) so that the lever extension 128 is extended to close eject switch 140. With the cycle gear 48 so positioned, the feeler contact 280 is located within the slot 252. The momentary conduction of the transistor 204 due to the discharge of the capacitor 358 energizes the relay winding 206 which causes the relay switch assembly 208 to toggle. Thus, the cycling motor 44 is energized to run as previously described. This moves the feeler contact 280 out of the slot 252 and applies a potential to the outer conductive ring 250. Consequently, the cycle motor 44 will drive the cycle gear 48 which causes a tape cartridge to be pulled into engagement with the changer 12 tape playing mechanism. The cycling gear 48 continues to rotate until the feeler 280 falls into the notch 254 on the interior of the outer conductive ring 250. At this time, the cycle motor 44 is de-energized and the Program One tracks of the tape cartridge are played. Once the Program One tracks have been played, at the very end of the tracks, the foil sensor 42 will detect the conductive foil on the magnetic tape. This initiates a cycle which energizes cycle motor 44 to drive the cycle gear 48 which begins to rotate. The energization of the cycle motor 44 occurs in the manner previously described. The motor 44 will remain energized until feeler contact 280 falls into the next notch 256. This occurs approximately 12° of rotation of the cycling gear 48 and is associated with shifting the transducer assembly 38 to a position to play the Program Two set of tracks. The cycle repeats after the Program Two and Program Three tracks have been played. At the end of the Program Four tracks the cycle gear 48 begins to rotate and the feeler contact 280 moves out of the notch 260 onto the conductive outer ring 250 to initiate ejection of the tape cartridge to reposition it in its cartridge receptacle.

A switch assembly 368 includes four individual switches 370, 372, 374 and 376. These switches are associated with each of the cartridge receptacle positions, one switch for each of the four programs. As was previously indicated, the schematic circuit diagram is shown with the changer conditioned to play the Program Four set of tracks. In this position, a feeler contact 278 is resting on the conductive pad 268. Should the switch 276 be closed, a voltage would be applied via the leads 178 and 282, a resistor 378, the closed switch 376 and the feeler contact 278 to the conductive pads 268. This voltage, in the manner previously described, causes energization of the cycle motor 44. Because the Program Four tracks are being played, rotation of the cycle gear 48 moves the feeler contact 280 onto the outer conductive ring 250 to initiate a cartridge eject cycle. However, if one of the other switches, such as switch 372, were closed when the Program Two tracks of the tape cartridge are played, the cycle gear 48 would rotate only until the feeler contact 280 fell into the notch 258. This would cause the transducer head assembly 38 to be shifted from a position where the Program Two set of tracks are played to a position where the Program Threee set of tracks are played.

It will be noted that the two switches 318 and 362 which are ganged for unicontrol, are labelled "MANUAL," "AUTOMATIC" and "REPEAT." The switches are shown in the REPEAT position and are controlled by a switch lever 363 on the changer control panel 24. The switches function to control the mode of operation of the cartridge tape changer machine.

When the switches 318 and 362 are in the REPEAT position as shown in the drawing, switch 318 is open and switch 362 is closed. Thus, even though the relay switch contact assembly 310 may toggle due to transistor 302 being biased for conduction (indicating that the changer is in the cartridge eject position), a potential is not applied to the transport motor 52 and the movable platform 28 does not move. The toggling of the relay switch assembly 310, however, does permit the capacitor 358 to charge. Consequently, when the relay switch assembly 310 contacts assume the position shown in the drawing, the capacitor 358 discharges through the closed switch 362 to initiate a changer cycle to draw the ejected cartridge back into operative engagement with the changer capstan 30 and transducer assembly 38. In this mode of operation, a given cartridge will be continually replayed, with the changer ejecting the cartridge at the end of the Program Four tracks and immediately thereafter pulling the cartridge back into engagement with the player mechanism and commencing to play the Program One set of tracks.

Where the switches 318 and 362 are conditioned to be in the AUTOMATIC position, the switches 318 and 362 are closed. Thus, the transport motor 52 is energized when the relay switch assembly 310 toggles and drives and worm screw 50 to move the platform 28 to the next occupied, programmed, cartridge receptacle position as previously described. The AUTOMATIC position for the switches is associated with the sequential mode of operation (except where a cartridge is programmed not to be played, i.e., switch 340 closed) for the tape cartridge changer 12.

Where the switches 318 and 362 are in the MANUAL position, both switches are open. With the switches open, the transport motor 52 is not energized when the relay switch assembly 310 toggles and the movable platform 28 remains at the cartridge receptacle position of the cartridge just played. Moreover, the capacitor 358 is not permitted to discharge through the switch 362. Thus, a changer pull-in cycle is not initiated and the changer mechanisms are at rest (motors 44 and 52 not energized) with all the cartridges in an ejected position. The last cartridge ejected is pulled in and replayed when switch 301 is closed. In this mode of operation, the tape cartridge changer 12 functions in a manner similar to conventional single tape cartridge playing machines wherein a cartridge is inserted into the changer, played, and thereafter ejected, at which time a user can either replay the cartridge (close switch 301) or remove the cartridge and substitute a different cartridge.

Additionally, it will be noted that two switches 380 and 382, which are ganged for unicontrol, labelled AUTOMATIC ON/OFF are provided. These switches, when actuated, cause a tape cartridge, if it is being played, to be ejected and the movable platform 28 to move down to the bottom of its vertical path of travel, return to the top of its vertical path of travel, and de-energize the changer 12 with the changer components positioned to begin a new cycle starting at the uppermost cartridge receptacle when the changer is again energized.

When switch 380 is closed, a voltage is applied via the lead 178, the switch, and a resistor 384 and a contact feeler 386 to the conductive ring 250. Consequently, cycle motor 44 will be energized to run until the feeler 386 falls into the slot 252. This position of the cycle gear 48 is associated with the eject position of the cartridge. Once this occurs, the eject lever switch 140 closes and the relay winding 306 becomes energized from the regulated voltage supply 146 via the lead 156, the eject lever switch 140, the lead 388, and the switch 382. The motor will continue to run moving the movable platform 28 down until the reversing switch 328 is actuated to reverse the direction of rotation of the motor. The motor will continue to run until the movable platform hits the ON/OFF switch assembly 390 (FIGS. 2 and 6) which causes the switches 158, 322, 389 and 382 to simultaneously open. As a result, there is an immediate total de-energization of the changer 12.

V. TRACK SELECTION SWITCH ASSEMBLY

As previously indicated, a series of switches 370, 372, 374 and 376 are associated with each of the cartridge receptacle positions within the array 16 so that the program tracks of a tape cartridge whose tape is engaged with the changer capstan 30 and transducer assembly may be selectively played or omitted. Each of the switches 370, 372, 374 and 376 is housed within a separate switch module 371 (FIG. 2) which is electrically connected to contacts 373 associated with each module. Each of the contacts 373 project through a wall 389 and cooperate with one of four feeler contacts 375 which ride on an assembly 377 mounted to the movable platform 28. The assembly 377 includes a bracket 385 pivotally mounted to the movable platform 28 by a screw bushing 381.

As the movable platform 28 descends, each of the four feeler contacts 375 cooperate with the corresponding contact 373 at the particular cartridge receptacle position involved. Thus, the switches 370, 372, 374 and 376 are operably connected in the electrical circuit as shown in FIG. 5 at each of the cartridge receptacle positions, and the position of the track switches determines whether or not a particular set of program tracks of the tape cartridge will be played or omitted.

When the movable platform 28 descends toward the bottom plate 58 after the lowermost cartridge receptacle position in the array 16 has been passed, a screw 379 mounted to the bracket 385 strikes the bottom plate 58 and assembly 377 pivots clockwise around the screw bushing 381 moving the feeler contacts 375 out of engagement with the contacts 373. The program switch operator 346 which is part of the assembly 377 also moves out of engagement with notched cam surface 350. This allows an unobstructed ascension of the movable platform 28 toward the top plate 54.

When the assembly 377 is forced to rotate clockwise, a spring feeler 383 drops into a detent in the bracket 385 to hold the switch assembly 377 in its rotated position. As the movable platform 28 approaches the top plate 54, the sloped surface of a stud 387 bears against the spring feeler 383 to urge it out of the notch in the bracket 385. Freed to rotate, the switch assembly 377 rotates counterclockwise under the bias force of a spring secured to the screw bushing 381 and is urged against the wall 389 through which the contacts 373 project. Thus, the switch assembly 377 is conditioned so that the movable platform 28 descends, the feeler contacts 375 engage the contacts 373 at each of the cartridge receptacle positions to operably connect the switches 370, 372, 374 and 376 in the electrical circuit. Additionally, the switch operator 346 contacts the notched cam surface 350.

VI. MANUAL/AUTOMATIC AND POWER ON/OFF SWITCH ASSEMBLY

The operation of the MANUAL/AUTOMATIC and POWER ON/OFF switch assembly 390 is best understood by reference to FIG. 6 which shows the switch assembly in its totally OFF condition. This condition obtains when the movable platform 28 is at the top of its vertical path of travel and switches 158, 322, 380 and 382 are open. The switch assembly 390 includes a first section 392 which houses the switches 158 and 322. The switches 158 and 322 are ganged for unioperation and are operated by a tab 396 on a lever 398 which projects through a slot 400 into the interior of the switch assembly section 392. The lever 398 extends through the changer cabinet assembly panel 24 and is designated as POWER ON/OFF. The switches 380 and 382 which are housed within a second switch assembly section 394 are operated by a switch lever 402 which projects through a slot (not shown) in the switch assembly section 394.

When the lever 398 is moved forward (toward the back of the changer) against the tension of the bias spring 404, the leading edge 406 of the lever bears against a shoulder 408 in a lever 410 and moves the lever forward. This causes the assembly consisting of the lever 410, a lever 422 and a hammer 416, all secured by a pin 420, to displace forward. The lever 410 is guided by a slot in a guide member 411 and a slot in a support wall 413. Lever 422 is also guided by a slot in the support wall 413. The hammer 416 is displaced so that a cam surface 414 on hammer 416 moves beyond the end 403 of the switch lever 402 upon which it rides. As the cam surface 414 moves past the switch lever end 403, the hammer 416 is permitted to rotate around the pin 420 toward the section 394 after the lever 398 is released and displaces slightly rearward (toward the front of the changer) out of the path of travel of the hammer. A portion 415 of the hammer, after it has rotated, lies in the path of the leading edge 406 of the lever 398.

When the lever 398 begins its rearward travel under the action of the bias spring 404 after a user releases the depressed lever 398, it is restricted in its rearward travel by a pivotal blocking member 426. The lever 398 is restricted at a point such that the switch operator 396 causes the switches 158 and 322 to be in their closed condition. The operation of the pivotal blocking member 426 is as follows. The initial forward displacement of the lever 398 causes a tab, not shown, to strike the rotary member 426 above its pivot point 428. This causes the rotary member 426 to rotate in a counterclockwise direction as viewed in FIG. 6 such that the lowermost rear edge of the member deflect downward. The deflection is limited by a stop 430. As the lever 398 moves rearward, the tab 396 engages the rotated shoulder of the pivotal blocking member 426 and is locked in place. At this time, the tape cartridge changer machine 12 is conditioned for normal play operation.

When the changer 12 is so conditioned, the movable platform will stop at each cartridge receptacle position which has a cartridge present and has the program switch lever 344 in its play position. After all the cartridges in the array 16 of cartridge receptacles have been played, the movable platform 28 will begin to move up toward the changer top plate 54. As it approaches the top plate 54, the movable platform 28 strikes a rod 432 which is forced up through a bushing 434 and against the underside of a lever 436. This forces the lever 436 to rotate around a pin 438. The rotary motion of the lever 436 is coupled by a flat leaf spring 440 to the shoulder of a hammer shaped lever 442. This forces the hammer shaped lever 442, which is normally biased by a spring (not shown) to be in its position as shown in FIG. 6, to rotate about the pin 438 to strike the pivotal blocking member 426 and cause it to rotate in a clockwise direction. With the tab 396 no longer blocked by the lower shoulder of the pivotal blocking member 426, the lever 398 under the force of the spring 404 displaces rearward and causes the switch operator 396 to open the switches 158 and 322 to deenergize the changer 12. During its rearward travel, a tab 444 on the lever 398 bears against a portion 399 of the lever 422 forcing it rearward with the lever 398. The rearward motion of the lever 422 is coupled through the pin 420 to the lever 410 and hammer 416. This permits the hammer structure cam surface 414 to ride up onto the end 403 of the switch lever 402 and deflect the hammer 416 out of the path of travel of the leading edge of the lever 398.

Where the tape cartridge changer machine 12 has been conditioned to run and is in the midst of playing a cartridge, it is desirable to be able to turn the changer completely off. To accomplish this function, the lever 398 is once again depressed, pushed forward, by pressing against the POWER ON/OFF switch operator on the panel 24. When this occurs due to the interference of the hammer portion 415 (which has already rotated after the first push of the POWER ON/OFF switch operator) and the leading edge 406 of the lever 398, the switch lever 402 for the ganged switches 380 and 382 is moved to close the switches as the lever 402 is carried forward. The force of the leading edge 406 of the lever 398 against the hammer 416 is coupled through the hammer and pin 420 to the lever 410 and lever 422 which are displaced further forward with the hammer 416. The closing of the switches 380 and 382, in the manner previously described in connection with the schematic circuit diagram, causes the changer 12 to be thrown into a reject cycle whereby a cartridge, if it is being played, is ejected and the movable platform after descending toward the bottom plate 58 ascends toward the top plate 54 at which time the rod 432 is struck.

When the rod 432 is struck, it is forced against the underside of the lever 436 which pivots about the pin 438. This rotary motion is coupled by flat leaf spring 440 to the hammer shaped lever 442 which rotates about pin 438 and strikes the pivotal blocking member 426 to cause it to rotate out of its interference position with the tab 396. Thus, the lever 398 under the action of the spring 404 displaces rearward and the tab 444 on the lever engages the portion 399 of lever 422 which causes the lever 422, the hammer 416, and the lever 410 to displace rearward. Moreover, the hammer cam surface 414 rides up onto the end 403 of the switch lever 402 and forces the hammer 416 to rotate outward. The rearward motion of the lever 410 causes the lever projection 412 to bear against the switch operator 402 to open the ganged switches 380 and 382. Similarly, the rearward motion of the tab 396 on the lever 398 opens the switches 158 and 322 to totally deenergize the changer.

Should it be desired to have the tape cartridge changer machine 12 conditioned so that it will continually recycle, playing all the cartridges inserted within the array 16 of cartridge receptacles over and over, a lever 446 is displaced forward. The lever projects through the panel 24 and is designated MANUAL-/AUTOMATIC. When the lever 446, which is normally biased in its rearward position by a coil spring 448, is displaced forward, a projection 450 on the lever is positioned to interfere with the rotation of the hammer shaped lever 442. When the movable platform 28 strikes the rod 432 and forces it to push against the underside of the lever 436, which motion is communicated by the flat leaf spring 440 to the hammer shaped lever 442, the hammer shaped lever 442 begins to rotate. Nevertheless, because of the interference between the hammer shaped lever 442 and the projection 450, it is restricted and additional force applied by the lever 436 to the leaf spring 440 causes the spring end 441 to slip off the shoulder of the hammer shaped lever 442. When the movable platform descends and the pin 432 is no longer biased against the underside of the lever 436, the lever 436 rotates down and the leaf spring end 441 slides back to again engage the shoulder of the hammer shaped lever 442.

The initial forward displacement of the lever 446 permits an S-shaped spring 452 which normally rests on the upper surface 453 of the lever 446 to drop into a notch 454 in the lever 446. This detents lever 446 and additionally permits another portion 456 of the S-shaped spring 452 to drop into a notch 458 in the lever 398. In this manner, the levers 398 and 446 are secured together by the S-shaped spring 452. When the changer is operating under these conditions, the lever 446 can individually be pulled rearward to condition the changer to turn off after the last cartridge in the array 16 has been played. In the alternative, the lever 398 can be displaced forward to initiate the shut-off cycle previously described.

The forward displacement of the lever 398 causes the portion 456 of the S-shaped spring 452 to be deflected upward. This causes the portion 455 of the S-shaped spring 452 to also be displaced upward above the notch 454 in the lever 446. Thus, the lever 446, under the action of the spring 448, displaces rearward and the projection 450 of the lever is positioned out of the path of rotation of the hammer shaped lever 442. Consequently, when the movable platform 28 reaches the top of its vertical path of travel and strikes the rod 432, the tape cartridge changer machine 12 turns completely off.

What is claimed is:

1. A tape cartridge changer including a playing mechanism comprising:

a plurality of tape cartridge receptacles each adapted to receive a tape cartridge;

a movable structure supporting a portion of said changer playing mechanism;

means for moving said movable structure along a predetermined path of travel adjacent said receptacles;

stop means adjacent each receptacle to block an inserted cartridge from being positioned in the path of travel of said movable structure; and said further means including said movable structure as it moves toward a cartridge receptacle for causing said stop adjacent a cartridge filled receptacle to be moved away from said blocking position to permit said cartridge to be brought into operative engagement with the portion of the changer playing mechanism supported by said movable structure.

2. A tape cartridge changer as defined in claim 1 which includes means mounted to said movable structure and adapted to be actuated by said detector means when a cartridge is sensed as being present in the cartridge receptacle, said means operable when actuated to stop said movable structure at a predetermined point adjacent the cartridge receptacle.

3. The invention according to claim 2, wherein said means actuated by said detector includes switching means operable to disable said movable structure moving means.

4. In a tape cartridge changer of the type having an array of cartridge receptacles each adapted to receive a tape cartridge and a tape playing mechanism including a structure movable between the cartridge receptacles of the array, a receptacle structure comprising:

a housing having an open front portion and an open rear portion, said open front portion adjacent the path of travel of said cartridge changer movable structure;

first means movable secured to said housing, said means movable between a first position to block the open front portion of said housing to restrict the movement of a tape cartridge inserted into said housing through said housing open rear portion and a second position away from the open front portion of said housing;

spring means coupled to said first means to bias said means in said first position to block the open front portion of said housing; and said changer movable structure being arranged to cause said movement of said first means from said blocking position to said second position as said cartridge changer movable structure becomes located adjacent said housing in a predetermined position for a cartridge in said housing to be brought into operative engagement with said change playing mechanism.

5. A structure as defined in claim 4 wherein said movable means includes an L-shaped member having a first portion which projects across the open front portion of said housing, and a second portion pivotally secured to said housing.

6. A structure as defined in claim 4 wherein said movable means include an element which projects through an opening in said housing to sense the presence or absence of a tape cartridge in said housing.

7. A structure as defined in claim 6 wherein said movable means is moved from said first blocking position to said second position when said movable structure is located in said predetermined position only if said element senses the presence of a tape cartridge in said housing.

8. A structure as defined in claim 7 wherein said movable means includes an L-shaped member having a first portion which projects across the open front portion of said housing when said movable means is in said first position and a second portion pivotally secured to said housing, and an element which projects throught an opening in said housing, said element mounted to said housing such that it is out of the path of travel of said movable structure when no tape cartridge is in said housing and is in the path of travel of said movable structure when a tape cartridge is in said housing.

9. A structure as defined in claim 8 wherein said element is a wire feeler having a first and a second end, said first end secured to said housing and said second end projecting through said opening in said housing, said wire feeler, when a cartridge is in said housing, positioned to interfere with and be deflected by said movable structure to bear against and displace said L-shaped member so that said L-shaped member first portion is moved away from the open front portion of said housing when said movable structure is in said predetermined position.

10. A structure as defined in claim 9 wherein the portion of said movable structure which engages said movable means includes the operator of a switch mechanism connected to stop said movable structure when in said predetermined position.

11. A structure as defined in claim 10 wherein said switch operator is mounted such that during movement of said movable structure in a first direction, said operator forces said wire feeler to bear against and displace said L-shaped member so that said L-shaped member first portion is moved away from the open front portion of said housing and during movement of said movable structure in a second direction, said switch operator is deflected to ride over said movable element.

* * * * *